United States Patent
Nummila-Pakarinen et al.

(10) Patent No.: US 9,976,020 B2
(45) Date of Patent: May 22, 2018

(54) POLYMER COMPOSITIONS AND EXTRUSION COATED ARTICLES

(71) Applicant: Borealis AG, Vienna (AT)

(72) Inventors: Auli Nummila-Pakarinen, Porvoo (FI); Mikko Peltovuori, Kotka (FI)

(73) Assignee: Borealis AG, Vienna (AT)

( * ) Notice: Subject to any disclaimer, the term of this patent is extended or adjusted under 35 U.S.C. 154(b) by 0 days. days.

(21) Appl. No.: 15/526,957

(22) PCT Filed: Nov. 20, 2015

(86) PCT No.: PCT/EP2015/077257
§ 371 (c)(1),
(2) Date: May 15, 2017

(87) PCT Pub. No.: WO2016/083266
PCT Pub. Date: Jun. 2, 2016

(65) Prior Publication Data
US 2017/0321048 A1 Nov. 9, 2017

(30) Foreign Application Priority Data
Nov. 24, 2014 (EP) ..................... 14194418

(51) Int. Cl.
C08L 23/12 (2006.01)
C09D 123/12 (2006.01)
B29C 47/00 (2006.01)
B29C 47/02 (2006.01)
B29K 23/00 (2006.01)

(52) U.S. Cl.
CPC ............ C08L 23/12 (2013.01); C09D 123/12 (2013.01); B29C 47/0004 (2013.01); B29C 47/0021 (2013.01); B29C 47/0064 (2013.01); B29C 47/02 (2013.01); B29K 2023/10 (2013.01); C08L 2205/02 (2013.01); C08L 2205/03 (2013.01); C08L 2314/06 (2013.01)

(58) Field of Classification Search
CPC .. C08L 23/12; C08L 2205/02; C08L 2205/03; C08L 2314/06; C09D 123/12; B29C 47/0004; B29C 47/0021; B29C 47/02; B29C 2023/10
See application file for complete search history.

(56) References Cited

U.S. PATENT DOCUMENTS

2004/0151853 A1* 8/2004 Shirrell et al. .......... B32B 27/08
428/35.7

FOREIGN PATENT DOCUMENTS

| CN | 1774471 A | 5/2006 |
|---|---|---|
| EP | 1 236 769 A1 | 9/2002 |
| EP | 1 449 878 A1 | 8/2004 |
| EP | 1 591 482 A1 | 11/2005 |
| EP | 1 892 264 A1 | 2/2008 |
| JP | 2006-518785 A | 8/2006 |
| JP | 5142470 B2 | 2/2013 |
| WO | WO 00/078859 A1 | 12/2000 |
| WO | WO 2002/072693 A1 | 9/2002 |
| WO | WO 2008/022803 A2 | 2/2008 |
| WO | WO 2011/039314 A1 | 4/2011 |
| WO | WO 2013/124221 A1 | 8/2013 |

OTHER PUBLICATIONS

U.S. Appl. No. 14/911,295, filed Feb. 10, 2016.
U.S. Appl. No. 14/911,299, filed Feb. 10, 2016.
U.S. Appl. No. 14/911,300, filed Feb. 10, 2016.
U.S. Appl. No. 14/914,501, filed Feb. 25, 2016.
U.S. Appl. No. 15/022,664, filed Mar. 17, 2016.
U.S. Appl. No. 15/022,671, filed Mar. 17, 2016.
U.S. Appl. No. 15/027,129, filed Apr. 4, 2016.
U.S. Appl. No. 15/029,493, filed Apr. 14, 2016.
U.S. Appl. No. 15/030,556, filed Apr. 19, 2016.
U.S. Appl. No. 15/039,107, filed May 25, 2016.
U.S. Appl. No. 15/101,837, filed Jun. 3, 2016.
U.S. Appl. No. 15/102,628, filed Jun. 8, 2016.
U.S. Appl. No. 15/103,744, filed Jun. 10, 2016.
U.S. Appl. No. 15/103,783, filed Jun. 10, 2016.
U.S. Appl. No. 15/106,101, filed Jun. 17, 2016.
U.S. Appl. No. 15/113,517, filed Jul. 22, 2016.
U.S. Appl. No. 15/113,907, filed Jul. 25, 2016.
U.S. Appl. No. 15/113,922, filed Jul. 25, 2016.
U.S. Appl. No. 15/115,929, filed Aug. 2, 2016.
U.S. Appl. No. 15/310,283, filed Nov. 10, 2016.
U.S. Appl. No. 15/514,641, filed Mar. 27, 2017.
European Patent Office, International Search Report in International Application No. PCT/EP2015/077257 (dated Jan. 5, 2016).
European Patent Office, Written Opinion in International Application No. PCT/EP2015/077257 (dated Jan. 5, 2016).
European Patent Office, International Preliminary Report on Patentability issued in International Application No. PCT/EP2015/077257 (dated Feb. 17, 2017).
Japan Patent Office, Notice of Reasons for Rejection in Japanese Patent Application No. 2017-523953 (dated Sep. 14, 2017).
State Intellectual Property Office of the People's Republic of China, First Notification of Office Action in Chinese Patent Application No. 2015800633384 (dated Oct. 10, 2017).
*Crystalline Olefin Polymers, Part II*, R.A.V. Raft and K.W. Doak, Editors, Interscience Publishers, New York, pp. 478-484 (1964).
*Kunststoff Handbuch, Band IV: Polyolefine*, (Plastic Handbook, vol. IV: Polyolefins) R. Vieweg, A. Schley and A. Schwarz, Editors, Carl Hanser Verlag, Munich, German. 20: 412-420 (1969).

* cited by examiner

Primary Examiner — Nathan M Nutter
(74) Attorney, Agent, or Firm — Leydig, Voit & Mayer, Ltd.

(57) ABSTRACT

The present invention relates to a polymer composition (A) comprising a blend of i) 60 to 90 wt-% of propylene polymer composition (a) comprising a blend of (a-1) 55 to 95 wt-% of propylene polymer and (a-2) 5 to 45 wt-% of low density ethylene polymer and ii) 10 to 40 wt-% of a plastomer (b) of ethylene copolymer. The invention relates also to extrusion coating articles, comprising at least a substrate layer and a heat sealable layer, wherein composition (A) is used as said heat sealable layer, process for producing the extrusion coated articles as well use of the composition (A) as a heat sealable layer in an extrusion coated article.

17 Claims, 1 Drawing Sheet

POLYMER COMPOSITIONS AND EXTRUSION COATED ARTICLES

CROSS-REFERENCE TO RELATED APPLICATIONS

This patent application is the U.S. national phase of International Application No. PCT/EP2015/077257, filed on Nov. 20, 2015, which claims the benefit of European Patent Application No. 14194418.1, filed Nov. 24, 2014, the disclosures of which are incorporated herein by reference in their entireties for all purposes.

The present invention relates to polymer compositions having improved sealing properties. Especially the present invention relates to polypropylene-based composition blends, which have good sealibility, like hot-tack properties and good processability properties making them suitable for producing articles comprising at least two layers and prepared by an extrusion coating process. Further, the invention relates to extrusion coated articles, and preparation thereof, which articles comprise a substrate layer and at least one film layer of said polypropylene based composition blend having good heat resistance, improved sealibility, like hot-tack properties and in addition having good processability properties suitable for extrusion coating.

Laminates and single or multi-layer films are packaging materials that often employ heat-sealable layer(s). Laminates are often made by coating a substrate, like a fibrous substrate, such as paper, paperboard or Kraft paper or woven or non-woven fabrics; a metal foil, such as aluminium foil or a plastic film, such as an oriented polypropylene film, PET film, PA film or cellophane film, metallised films or combinations thereof with a heat-sealable layer by extrusion coating. A heat-sealable layer in such articles makes it possible to seal the material to form structures such as bags or other packages and lidding materials. In order to facilitate sealing, the heat-sealable film is usually employed singly or as the outermost or innermost layer in the case of multi-layer structures. As additional layers can be used fibrous, polymeric, metallic or any material needed for producing desired structure and properties.

In preparing an extrusion coated article the polymer is extruded onto the moving substrate through a flat die. When the melt exits the die the melt film is pulled down into a nip formed between two rollers, the pressure roll and the chill roll, situated below the die. The substrate, moving at a velocity which is higher than that of the melt film, draws the film to the required thickness. The pressure between the two rolls forces the film onto the substrate. Further, the film is cooled and solidified by the low temperature of the chill roll. The draw-down ratio, which is one of the characteristic parameters of the extrusion coating process, is the ratio of the die gap to the thickness of the polymer film on the substrate.

In a typical extrusion coating process the substrate is passed at a high velocity, typically more than 100 m/min. Modern machines are designed to operate at lines speeds of up to 1000 m/min. In the instant application "line speed" and "draw-down speed" are considered as synonyms denoting the speed of the substrate in the coating line.

Description of extrusion coating process is given, for instance, in Crystalline Olefin Polymers, Part II, by R. A. V. Raff and K. W. Doak (Interscience Publishers, 1964), pages 478 to 484, or in Vieweg, Schley and Schwarz: Kunststoff Handbuch, Band IV, Polyolefine, Carl Hanser Verlag (1969), 20, pages 412 to 420.

Low density polyethylene (LDPE) is a resin mainly used in extrusion coating because of the ease thereof in processing. However, stiffness, barrier properties, temperature resistance and sealibility properties, especially hot-tack properties, of LDPE are often not satisfactory.

Polypropylene is used for a variety of products, such as packaging films and moulded shapes. Commercial propylene polymers exhibit several desirable properties, such as good heat resistance, which make polypropylene polymers favorable in many application fields. High heat resistance is a desired feature in many application areas, like in food packaging and in health care area. If a very high melt temperature polymer is needed propylene homopolymer is often a preferred choice. Propylene-block copolymer is a preferred choice, if lower melt temperature or a broader temperature window is desired.

WO2011/039314 discloses a film or sheet prepared by typical film making processes, like blown film or cast film process, and to be used as heat seal film. The film comprises a polyolefin layer comprising a blend of an ethylene based plastomer with a propylene-ethylene heterophasic polymer composition. Said propylene-ethylene heterophasic polymer composition is a composition of propylene homo- or copolymer and ethylene-propylene copolymer and is prepared by sequential polymerization in two or more reactors (reactor blend) using highly stereospecific Ziegler-Natta catalyst. The film material of WO2011/039314 is not disclosed to be used in an extrusion coating process.

Some examples of extrusion coating process and extrusion coated articles are disclosed e.g. in WO2000/78859 and WO2013/124221, both based on polyethylene based compositions.

High line speed sets heavy requirements for the material. Therefore as drawback in using polypropylene is that polypropylene show poor processability in high speed extrusion coating, although some other properties, like high heat resistance, would be desired in many extrusion coating applications. Signs of poor processability are instabilities in web edges (edge weaving) and in coating weight (pumping, draw resonance). Edge tear or web breaks indicate limitations in draw-down speed. Instead good processability means web stability at high draw-down speeds and ratios resulting in even coating weight over the whole web.

In order to make polypropylene more attractive in extrusion coating process, the processability of polypropylene in extrusion coating process has to be improved. One way to improve the processability of polypropylene is to modify the polymer composition by adding processability improving component(s) to the polymer composition. As LDPE is known to have good processability properties, it is known to improve processability of propylene polymer composition by adding LDPE to the composition. LDPE is also used to improve polymer adhesion properties to a substrate layer.

Further, in addition to problems relating to the processability, polypropylene has a reasonable narrow sealing window, i.e. the sealing properties are not at all ideal for producing extrusion coated articles, where sealing properties are of great importance. Sealing properties are typically defined by measuring hot-tack properties and heat sealing temperature range as defined later.

Also in some cases seal strength is considered. "Seal strength" is the strength of a heat seal after the seal has been fully cooled to ambient temperature.

However, the hot-tack properties, i.e. the properties of the seal at temperatures subsequent to formation of the seal while the seal is still warm are important indicators of seal performance in high speed packaging lines.

There are a number of different hot tack properties that are important for heat sealable films. One important hot tack property is the "initiation temperature." The initiation temperature is the first temperature above ambient at which a seal can be formed by applying a given pressure to a given thickness of film for a given length of time. In general, lower initiation temperatures are desirable because less energy is required to be used to form the seal and also the less time it takes for the initial seal to form at a given seal jaw temperature. Thus, production rates are capable of being increased.

Another important hot tack property is ultimate hot tack, or maximum hot-tack, which terms have in the present application the same meaning. Maximum hot tack is the largest strength the seal has at temperatures above the initiation temperature. Usually it is desirable that the maximum hot tack occurs at the lowest possible temperature.

Further, an additional hot tack property that is generally desired, is a wide processing window such that the film exhibits a suitable seal strength as measured over a broad temperature range.

It is also desired a high temperature hot tack such that the seal strength remains sufficient even at elevated temperatures.

The hot tack properties are often determined by the composition employed to form the film seal. As disclosed above, LDPE compositions, which have been widely used in extrusion coating field, have hot tack properties, which are not satisfactory for many applications. In some cases hot-tack properties of LDPE based extrusion coating compositions have been improved by blending plastomers with the LDPE composition. However, such PE-plastomer compositions do not fulfill the requirements of high temperature resistance, as disclosed above, and further processability problems limit the production capacity.

Therefore, due to many beneficial properties of polypropylene compositions they would form basis for a suitable solution. However, problems relating to processability and especially to sealing properties, like hot-tack properties and too narrow sealing window have to be solved.

Propylene polymer, especially propylene homopolymer has, a narrow sealing window and the lowest seal temperature is reasonable high. Sealing window and the lowest and highest seal temperatures are dependent not only on a heat sealable layer, but also on the layer to be sealed with, like substrate layer. I.e. the most desired sealing temperatures, seal strength and sealing window are not absolute values, but to be defined in each case. Sealing window in this application is defined to be the temperature range between the lowest sealing temperature (SIT), where hot-tack strength is reaching 2 N and highest sealing temperature (SET), where hot-tack strength is still at 2 N, when as substrate layer is used kraft paper. Maximum hot-tack strength is defined in the present application to be the maximum strength level along 20° C. interval of sealing range.

Thus, it would be highly desired to provide a new composition having high heat resistance and good sealibility properties, especially good hot-tack properties. Further, broader sealing window, i.e. a broader range between SIT and SET, would be an additional benefit. Additionally, processability of such layer should be suitable for high speed lines.

Further, it would especially desired to provide a polymer layer structure having good processability properties, high heat resistance and good sealibility properties, especially good hot-tack properties. Further, broader sealing window, i.e. having a broader range between SIT and SET, would be an additional benefit.

Further, it would be highly desired to provide an extrusion coated article, like laminate, comprising a substrate layer, at least one layer having high heat resistance, good sealibility properties, especially good hot-tack properties. Further, a broader sealing window, as indicated above, is an additional desired beneficial feature.

Still, it is especially desired to have an extrusion coated article comprising a substrate layer and a polymer layer structure having good sealibility properties as defined above, good processability, adhesion properties, barrier properties and/or any other properties needed for defined end applications.

One way to improve the processability properties of polypropylene, i.e. propylene homo- or copolymers, is to modify the polypropylene by adding low density polyethylene (LDPE) into the polypropylene polymer. However, adding LDPE does not contribute to achieving good hot-tack properties.

SUMMARY OF THE INVENTION

The present invention relates to a polymer composition comprising a blend of propylene polymer based composition and ethylene copolymer based plastomer, which blend has good sealing properties, high heat resistance and has processability properties suitable to be used in extrusion coating process.

Therefore, a further object of the invention is the use of the polymer composition comprising a blend of propylene polymer based composition and ethylene copolymer based plastomer in extrusion coating processes comprising coating a substrate with said polymer composition.

A further object of the present invention is to provide a polymer layer structure comprising a layer of the polymer composition comprising a blend of propylene polymer based composition and ethylene copolymer based plastomer and a layer of any other polymer composition. Further, the present invention relates to an extrusion coated article comprising at least a substrate layer and at least a layer of the polymer composition comprising a blend of propylene polymer based composition and ethylene copolymer based plastomer. The article can comprise additional layers as well.

Further, the present invention relates to an extrusion coated article comprising at least a a substrate layer and a polymer layer structure comprising a layer of the polymer composition comprising a blend of propylene polymer based composition and ethylene copolymer based plastomer and a layer of any other polymer composition. The article can comprise additional layers as well.

The present invention relates also to the process for producing the extrusion coated article.

DETAILED DESCRIPTION OF THE INVENTION

It has now been found by the inventors a new polymer composition fulfilling the requirements of at least good sealing properties, high heat resistance and processability properties suitable for extrusion coating. In a preferred embodiment broader sealing window is also achieved.

It has been found that providing and using as the polymer composition a specific blend of propylene polymer based composition with a plastomer, sealability measured by hot-tack properties of the polymer can be improved. Further, said composition fulfills the processability requirements for extrusion coating process.

Plastomers are generally defined as a polymer material which combines properties of elastomers and plastics, such as rubber-like properties with the processing ability of plastic. Significant plastomers are selected from ethylene-alpha olefin copolymers.

Thus, the present invention relates to a new polymer composition (A) comprising a blend of
i) 60 to 90 wt-% of propylene polymer composition (a) comprising a blend of
(a-1) 55 to 95 wt-% of propylene polymer
(a-2) 5 to 45 wt-% of low density ethylene polymer
where the amounts of (a-1) and (a-2) are based on the total weight of composition (a), and composition (a) has a melt flow rate $MFR_2$ of from 10 to 50 g/10 min (230 C/2.16 kg) and the Vicat softening temperature in the range of 120 to 155° C. measured according to ISO 306,
and
ii) 10 to 40 wt-% of a plastomer (b) of ethylene copolymer with at least one α-olefin comonomer of 4 to 10 C-atoms, provided that at least one co-monomer is a monomer with at least 6 C-atoms
where the amounts of (i) and (ii) are based on the total weight of the composition (A), and
wherein the plastomer b) has a density of 880 to 912 kg/m3.

Further, the present invention relates to a polymer layer structure (PL) comprising
1) Layer 1 of polymer composition (A) comprising a blend of
i) 60 to 90 wt-% of propylene polymer composition (a) comprising a blend of
(a-1) 55 to 95 wt-% of propylene polymer
(a-2) 5 to 45 wt-% of low density ethylene polymer
where the amounts of (a-1) and (a-2) are based on the total weight of composition (a), and composition (a) has a melt flow rate $MFR_2$ of from 10 to 50 g/10 min (230 C/2.16 kg) and the Vicat softening temperature in the range of 120 to 155° C. measured according to ISO 306
and
ii) 10 to 40 wt-% of a plastomer (b) of ethylene copolymer with at least one α-olefin comonomer of 4 to 10 C-atoms, provided that at least one co-monomer is a monomer with at least 6 C-atoms
where the amounts of i) and ii) are based on the total weight of the composition (A), and wherein the plastomer b) has a density of 880 to 912 kg/m3
and
2) Layer 2 of a polymer composition being different to composition (A).

The polymer layer structure (PL) can comprise one or more of Layers 2.

Further, the present invention relates to an extrusion coated article (EC) comprising I. a substrate layer (S)
II. a heat sealable polymer layer (H) of composition (A) comprising
i) 60 to 90 wt-% of propylene polymer composition (a) comprising a blend of
(a-1) 55 to 95 wt-% of propylene polymer
(a-2) 5 to 45 wt-% of low density ethylene polymer
where the amounts of (a-1) and (a-2) are based on the total weight of composition (a) and composition (a) has a melt flow rate $MFR_2$ of from 10 to 50 g/10 min (230 C/2.16 kg) and the Vicat softening temperature in the range of 120 to 155° C. measured according to ISO 306, and
ii) 10 to 40 wt-% of a plastomer (b) of ethylene copolymer with at least one α-olefin comonomer of 4 to 10 C-atoms, provided that at least one co-monomer is a monomer with at least 6 C-atoms
where the amounts of (i) and (ii) are based on the total weight of the composition (A), and
wherein the plastomer b) has a density of 880 to 912 kg/m3.

The invention further relates to an extrusion coated article (EC) comprising a
I a substrate layer (S)
II polymer layer structure (PL) comprising
II-1) Layer 1 of composition (A) comprising a blend of
i) 60 to 90 wt-% of propylene polymer composition (a) comprising a blend of
(a-1) 55 to 95 wt-% of propylene polymer
(a-2) 5 to 45 wt-% of low density ethylene polymer
where the amounts of (a-1) and (a-2) are based on the total weight of composition (a) and composition (a) has a melt flow rate $MFR_2$ of from 10 to 50 g/10 min (230 C/2.16 kg) and the Vicat softening temperature in the range of 120 to 155° C. measured according to ISO 306,
and
ii) 10 to 40 wt-% of a plastomer (b) of ethylene copolymer with at least one α-olefin comonomer of 4 to 10 C-atoms, provided that at least one co-monomer is a monomer with at least 6 C-atoms
where the amounts of (i) and (ii) are based on the total weight of the composition (A), and
wherein the plastomer b) has a density of 880 to 912 kg/m3, and
II-2) Layer 2 of a polymer composition being different to composition (A).

Extrusion coated article can comprise more than one Layer 2 in the polymer layer structure (PL).

Layer 1 forms the heat sealable layer and forms the surface layer of the extrusion coated article.

Further, the present invention relates to a process for producing the extrusion coated articles (EC) by an extrusion coating process, wherein a substrate (S) is coated by extruding a heat sealable layer (H) or coextruding at least the polymer layer structure (PL) in a molten state through a flat die onto said substrate, wherein the heat sealable polymer layer (H) comprises composition (A) as defined above or the polymer layer structure (PL) is as defined above. The heat sealable layer (H) forms the surface layer of the article.

In addition the invention relates to the use of the composition (A) as heat sealable layer in extrusion coating article.

More details and preferred embodiments of the present invention are disclosed in this specification and in claims.

The extrusion coated articles can comprise in addition to the substrate layer(s) (S) and a heat sealable polymer layer (H) or polymer layer structure (PL) at least one additional layer (M), provided that the heat sealable layer forms always a surface layer of the extrusion coated article. Such optional layers (M) can be of any material suitable to be used in an extrusion coated article, like any polymeric layer, metal foil, metallised polymeric layer, fibrous material or combinations thereof. Layers (M) can be used for many purposes, like as adhesive layers, being typically of polymeric materials, tie layers, barrier layers or printing layers.

Thus, according to one preferred embodiment the present invention relates to an extrusion coated article comprising
1. a substrate layer (S)
2. a layer comprising at least a heat sealable polymer layer (H) made of composition (A) as defined above either as such or part of the polymer layer structure (PL) and
3. a layer (M)

provided that the heat sealable layer is the outer layer of the extrusion coated article.

Substrate Layer

In the articles of the present invention the substrate layer may comprise at least one layer of, among others, fibrous substrates, like paper, paperboard or Kraft paper or woven or non-woven fabrics, woven plastic, a plastic film, such as an oriented polypropylene film, PET film, PA film or cellophane film or a metal foil. In preferred embodiments the substrate layer is selected from paper, paperboard or Kraft paper, plastic film being a biaxially oriented polypropylene film, oriented PET film, oriented PA film, metallised biaxially oriented polypropylene film, woven fabric or plastic, and metal foil being an aluminium foil.

Propylene Polymer

Propylene polymer used in the composition of the present invention may be propylene homopolymer or propylene copolymer with ethylene and/or α-olefin comonomers of 4 to 12 C-atoms. Propylene copolymers can be random or block copolymers. If a very high heat resistance is desired, propylene polymer with high melt temperature is to be selected. In that case propylene homopolymer is a preferred choice. Propylene-ethylene block copolymer is often a preferred choice, if a lower melt temperature or a broader temperature window is desired.

The propylene homopolymer as well the copolymer can be a unimodal or multimodal polymer composition.

"Multimodal" or "multimodal distribution" describes a frequency distribution that has several relative maxima. In particular, the expression "modality of a polymer" refers to the form of its molecular weight distribution (MWD) curve, i.e. the appearance of the graph of the polymer weight fraction as a function of its molecular weight. If the polymer is produced in the sequential step process, i.e. by utilizing reactors coupled in series, and using different conditions in each reactor, the different polymer fractions produced in the different reactors each have their own molecular weight distribution which may considerably differ from one another. The molecular weight distribution curve of the resulting final polymer can be seen at a super-imposing of the molecular weight distribution curves of the polymer fraction which will, accordingly, show a more distinct maxima, or at least be distinctively broadened compared with the curves for individual fractions. A polymer showing such molecular weight distribution curve is called bimodal or multimodal, respectively.

The expression homopolymer used in the instant invention relates to a polypropylene that consists substantially, i.e. of at least 97 wt-%, preferably of at least 99 wt-%, and most preferably of at least 99.5 wt-%, especially 99.8 wt-% of propylene units. In a preferred embodiment only propylene units in the propylene homopolymer are detectable.

In case the polypropylene according to this invention is a propylene random copolymer comprising monomers copolymerizable with propylene, for example comonomers such as ethylene and/or $C_4$ to $C_{12}$ α-olefins, in particular ethylene and/or $C_4$ to $C_{10}$ α-olefins. $C_4$ to $C_{10}$ α-olefin is preferably 1-butene and/or 1-hexene. Preferably the random propylene copolymer comprises, monomers selected from the group consisting of ethylene, 1-butene and 1-hexene. Preferably, the total amount of comonomer, more preferably ethylene, in the propylene copolymer is preferably more than 0.5 but less than 10.0 mol.-%, still more preferably more than 0.5 but less than 7.0 mol.-%.

It is also possible that the polypropylene is a propylene copolymer comprising a polypropylene matrix and an ethylene-propylene rubber (EPR).

The polypropylene matrix can be a homopolymer or a copolymer, more preferably a multimodal, like bimodal, homopolymer or a multimodal, like bimodal, copolymer. In case the polypropylene matrix is a propylene copolymer, then it is preferred that the comonomer is ethylene or butene. However, also other comonomers known in the art are suitable. The preferred amount of comonomer, in the polypropylene matrix is at most 8.00 mol %. In case the propylene copolymer matrix has ethylene as the comonomer component, it is in particular preferred that the amount of ethylene in the matrix is at most 8.00 mol %, more preferably less than 6.00 mol %. In case the propylene copolymer matrix has butene as the comonomer component, it is in particular preferred that the amount of butene in the matrix is at most 6.00 mol %, more preferably less than 4.00 mol %.

Preferably, the ethylene-propylene rubber (EPR) in the total propylene copolymer consists up to 60 wt %. More preferably the amount of ethylene-propylene rubber (EPR) in the total propylene copolymer is in the range of 15 to 60 wt-%, still more preferably in the range of 20 to 50 wt-%.

In addition, it is preferred that in case the polypropylene is a copolymer comprising a polypropylene matrix and an ethylene-propylene rubber (EPR), the ethylene-propylene rubber (EPR) has an ethylene-content of up to 65 wt %.

In one embodiment the polypropylene is a branched polypropylene. Branching can be achieved by using specific catalysts, i.e. specific single-site catalysts. Reference is made for instance to EP 1 892 264 in which the preparation of branched polypropylene by use of a metallocene catalyst is described in more detail. Typically such a branched polypropylene, has branching index g' of less than 1.0, more preferably of less than 0.9, yet more preferably in the range of 0.3 to 0.9, like in the range of 0.4 to 0.8. The branched polypropylene can be a branched polypropylene homopolymer or a branched propylene copolymer.

In another preferred embodiment the branched polypropylene (b-PP) is a so called high melt strength polypropylene (HMS-PP). Different to the branched polypropylene discussed in the previous paragraph the high melt strength polypropylene (HMS-PP) has been obtained by chemical modification as discussed in detail below. It is known that such polymers can be determined by their rheological behavior. Accordingly the branched polypropylene, in particular the high melt strength polypropylene (HMS-PP), has preferably a strain hardening factor (SHF) of at least 1.7, more preferably of at least 1.9, yet more preferably in the range of 1.7 to 7.0, still more preferably in the range of 1.9 to 6.5 measured at a strain rate of $3.0\,s^{-1}$ and a Hencky strain of 2.5. Additionally or alternatively the high melt strength polypropylene (HMS-PP) can be defined by the branching index g'. Accordingly it is preferred that the high melt strength polypropylene (HMS-PP) has branching index g' of less than 1.0, more preferably of less than 0.9, yet more preferably in the range of 0.3 to 0.9, like in the range of 0.4 to 0.8.

Further, the polypropylene used in the present invention can be nucleated or filled polymer, where the filler material is preferably inorganic filler.

Ethylene Polymers

Ethylene polymer used in the composition of the present invention is a low density ethylene polymer (LDPE).

The meaning of low density polyethylene (LDPE) is well known and documented in the literature. Although the term LDPE is an abbreviation for low density polyethylene, the term is understood not to limit the density range, but covers the HP (high pressure) polyethylenes with low, medium and higher densities. Autoclave and tubular reactors are typically used in HP ethylene polymerization process. The term LDPE describes and distinguishes only the nature of HP polyethylene with typical features, such as different branching architecture, compared to the polyethylene produced in the presence of an olefin polymerization catalyst. Moreover, said low density polyethylene (LDPE) may be unsaturated. Preferably the low density polyethylene (LDPE) used in the present invention is an ethylene homopolymer.

In case the low density polyethylene (LDPE) is a copolymer, it comprises comonomers, typically selected from, but not restricted to, acrylates, acrylic acids, methacrylates, methacrylic acids and acetates.

Typically, and preferably the density of the low density polyethylene (LDPE) is higher than 860 kg/m$^3$. Preferably the density of the low density polyethylene (LDPE), i.e. of the LDPE homopolymer or copolymer, is not higher than 940 kg/m$^3$, i.e. is in the range of 860 to 940 kg/m$^3$, and preferably is from 880 to 930 kg/m$^3$, more preferably from 900 to 930 kg/m$^3$, like from 910 to 925 kg/m$^3$. LPPE used in the invention is preferably ethylene homopolymer having the density in the range of 860 to 940 kg/m$^3$, preferably from 880 to 930 kg/m$^3$, more preferably from 900 to 930 kg/m$^3$ Especially preferred density is from 910 to 925 kg/m$^3$.

The components of the propylene composition (a), i.e. propylene polymer (a-1) and low density polyethylene (a-2) are thus prepared separately in different polymerization processes and combined by blending for forming the propylene polymer composition (a).

In this application "blend" or "blending" means that different components are combined by mechanical blending, like melt or dry blending. The components are prepared separately in different processes.

A phrase "reactor blend of polymer" denotes a blend which is a polymer blend prepared in a multistage polymerisation process. The blends of the present invention are thus not any reactor blends.

Plastomer

Plastomers used in the present invention are low-density ethylene-copolymers comprising ethylene polymers with at least one-olefin comonomer. The comonomers are α-olefin comonomers of 4 to 10 C-atoms, provided that at least one co-monomer is a monomer with at least 6 C-atoms. I.e., if the plastomer is an ethylene terpolymer, then at least one monomer has 6 or more C-atoms. Preferably comonomers in ethylene-copolymers are selected from α-olefins of 6 to 10 C-atoms, preferably 6 to 8 C atoms, and are more preferably copolymers of ethylene with one α-olefin of 6 to 8 C-atoms, especially ethylene-octene coplymers.

Plastomers used in the present invention have low density, typically in the range of 880 to 912 kg/m$^3$, preferably 885 to 910 kg/m$^3$, and in some embodiments from 890 to 905 kg/m$^3$. MFR$_2$ (190° C./2.16 kg) of the plastomer is in the range of 3 to 25 g/10 min, preferably in the range of 5 to 20 g/10 min, and in some embodiments in the range of 5 to 15 g/10 min. Plastomers used in the present invention are preferably produced in solution process in the presence of metallocene catalyst.

Optional Additional Layers (M)

Layers (M) can be of any other material suitable to be used in an extrusion coated article, like any other polymeric layer, metal foil, fibrous material or combinations thereof. Layers M can comprise e.g. paper, paperboard or Kraft paper or woven or non-woven fabrics, a plastic film, such as an oriented polypropylene film, like a biaxially oriented polypropylene film, metallised biaxially oriented polypropylene film, optionally oriented PET film, optionally oriented PA film or cellophane film or a metal foil being an aluminium foil. Compositions can be optionally modified with other components to get desired properties. Additional layers M made of polymer compositions can also form at least one Layer 2 of polymer layer structure (PL).

A preferred composition (A) of the present invention comprises a blend of
  i) 65 to 85 wt-%, preferably 70 to 85 wt-%, still more preferably 75 to 85 wt-% of composition (a) and
  ii) 15 to 35 wt-%, preferably 15 to 30, and still more preferably 15 to 25 wt-% of plastomer (b)
based on the total amount of composition (A).

Further, a preferred composition (a) comprises a blend of
  (a-1) 60 to 95 wt-%, more preferably 65 to 90 wt-% of propylene polymer and
  (a-2) 5 to 40 wt-%, more preferably 10 to 35 wt-% of low density ethylene polymer based on the total weight of composition (a).

According to the definitions above, components (a-1) and (a-2) are prepared in separate and different polymerisation processes and are combined by blending.

Composition (a) has a melt flow rate MFR$_2$ of from 10 to 50 g/10 min (230 C/2.16 kg), and the Vicat softening temperature of the composition (a) is in the range of 120 to 155° C., preferably in the range of 125 to 155° C. measured according to ISO 306.

Thus, one preferred composition (A) comprises a blend
  i) 70 to 85 wt-% of composition (a) comprising a blend of
    (a-1) 55 to 95 wt-% of propylene polymer, more preferably 65 to 90 wt-% of propylene polymer and
    (a-2) 5 to 45 wt-%, more preferably 10 to 35 wt-% of low density ethylene polymer
    where the amounts of (a-1) and (a-2) are based on the total weight of composition (a) and composition (a) has a melt flow rate MFR$_2$ of from 10 to 50 g/10 min (230° C./2.16 kg) and the Vicat softening temperature in the range of 125 to 155° C. measured according to ISO 306,
    and
  ii) 15 to 30 wt-% of plastomer (b) of ethylene copolymer with at least one α-olefin comonomer of 6 to 10 C-atoms,
    where the amounts of (i) and (ii) are based on the total weight of the composition (A), and
    wherein the plastomer b) has a density of 880 to 912 kg/m3 and MFR$_2$ (190° C./2.16 kg) in the range of 3 to 25 kg/10 min.

Preferably the plastomer (b) used in all embodiments of the present invention is produced in solution process in the presence of a metallocene catalyst.

The plastomer used in in all embodiments of the present invention has MFR$_2$ (190° C./2.16 kg) in the range of 3 to 25 g/10 min, preferably 5 to 20 g/10 min.

Further, the plastomer used in all embodiments of the invention has density in the range of 880 to 912 kg/m$^3$, preferably 885 to 910 kg/m$^3$.

In one preferred embodiment the plastomer has MFR$_2$ (190° C./2.16 kg) in the range of 5 to 20 kg/10 min and density in the range of 885 to 910 kg/m$^3$.

MFR$_2$ (230° C./2.16 kg) of the composition (a) can be in the range of 10 to 50 g/10 min, preferably from 12 to 50 g/10 min.

In one preferred embodiment
propylene polymer (a-1) is a propylene homopolymer or a propylene ethylene block copolymer, and/or
the low density ethylene polymer (a-2) has a density of 900 to 930 kg/m$^3$.

All the preferred embodiments of compositions (A), (a) and plastomer (b), and layers (S), (H), (PL), Layer 1, Layer 2 and (M) are applicable to all extrusion coated articles (EC) of the present invention as preferred embodiments.

The compositions (a) and (A) of the present invention may be formed by any common blending technique, like using melt or dry blending. In the case of using melt blending technique for forming compositions (A), the polymeric components are melt compounded in compounding extruder, typically a twin-extruder. It is also possible to use dry blending of the components at an extrusion coating line. Optionally, additional additives such as fillers, slip agents, anti-block agents, antioxidants, chill roll release agents and polymer process aid can be incorporated into the melt blends and dry blends.

The composition (A) of the present invention is surprisingly well suitable for forming a heat sealable film having improved hot-tack properties and for use in extrusion coated articles. By using a film made of composition (A) as the only layer on a substrate or as an outer layer of the extrusion coated multilayer article makes the extrusion coated articles very suitable for packaging materials, where good sealing properties, like good hot tack properties are required within a wide temperature range.

In addition to the good sealing properties also very good processability is obtained using composition (A) as the only layer on the substrate or being part of the polymer layer structure (PL) as defined above. As defined above said polymer layer structure (PL) comprises a layer (Layer 1) of composition (A) and another layer (Layer 2) of polymer composition being different to composition (A). In order to fulfill good processability properties, Layer 2 should also be of polymer composition fulfilling good processability properties. Examples of such polymer compositions suitable for Layer 2 are LDPE optionally blended with polypropylene (where the majority of polymer is LDPE), polypropylene blends with LDPE, where the majority of the polymer is polypropylene, or any other polymer composition fulfilling the requirement of processability and other properties needed for each application. In case good heat resistance is of importance polypropylene blends with LDPE, where the majority of the polymer is polypropylene, is a proper choice. One possibility is to use as Layer 2 a polypropylene composition with 5 to 45 wt-% LDPE, i.e. composition (a) as defined above. This type of polymer layer structures provide in addition to very good sealing properties also good processability properties and good adhesion to the substrate layer (S) in extrusion coating process also in a high-speed process.

As indicated above, heat sealing property is one of the main indexes used in evaluating the packaging materials. The heat seal properties include hot tack strengths and heat seal temperature range. Hot tack strength refers to the peel force of the sealing area when it is not yet completed cooled down.

The inventive composition (A) used as heat sealing layer (H) in extrusion coated article, where kraft paper is used as substrate, has maximum hot-tack strength of more than 4 N, preferably at least 4.5 N. Maximum hot-tack strength is defined to be the maximum strength level along 20° C. interval of sealing range.

Other important features of sealing materials are SIT and SET values. The lowest sealing temperature (SIT) in the present invention, when as substrate layer is used kraft paper, is defined to be the temperature, where hot-tack strength is reaching 2 N and the highest sealing temperature (SET) is the temperature, where hot-tack strength is still at 2 N.

Figure 1:
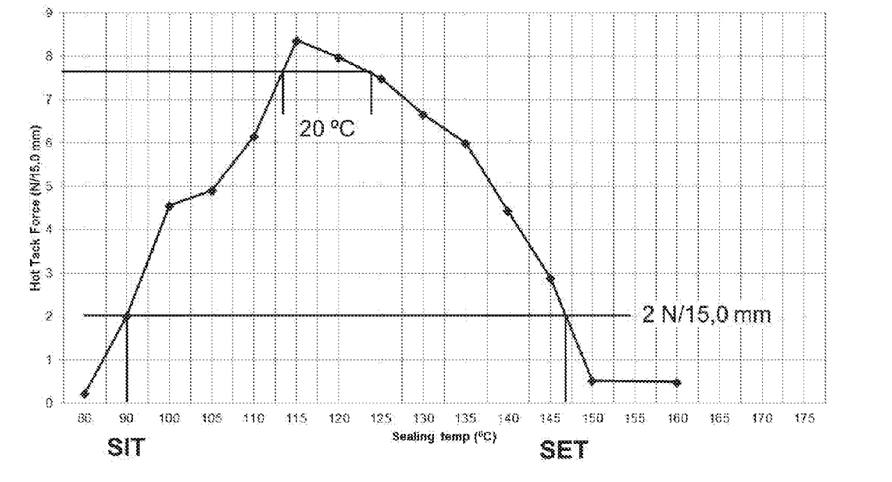
The FIGURE illustrates the hot tack force as a function of sealing temperature for a polymer composition according to present invention. Kraft paper was used as the substrate.

The sealing property definitions used in the present invention are illustrated in the FIGURE. It is to be noted that values disclosed in the FIGURE are only illustrative to clarify the definitions and do not represent properties of the present invention.

Low SIT value and broad sealing window are especially important sealing properties in packaging industry, where line speed and process integrity are essential elements.

The extrusion coating process may be carried out using conventional extrusion coating techniques. Hence, at least the composition (A) according to the present invention is fed, typically in the form of pellets, optionally containing additives, to an extruding device. From the extruder the polymer melt is passed preferably through a flat die to the substrate to be coated. The coated substrate is cooled on a chill roll, after which it is passed to edge trimmers and wound up. The die width typically depends on the size of the extruder used. Thus with 90 mm extruders the width may suitably be within the range of 600 to 1,200 mm, with 115 mm extruders from 900 to 2,500 mm, with 150 mm extruders from 1,000 to 4,000 mm and with 200 mm extruders from 3,000 to 5,000 mm. The line speed (draw-down speed) is preferably 75 m/min or more, more preferably at least 100 m/min. In most commercially operating machines the line speed is preferably more than 300 m/min or more than 500 m/min. Modern machines are designed to operate at lines speeds of up to 1,000 m/min, for instance 300 to 800 m/min. The temperature of the polymer melt is typically between 240 and 330° C. The polypropylene composition (A) of the invention can be extruded onto the substrate as a monolayer coating or as an outer layer in the co-extrusion process. In a multilayer extrusion coating, a polymer layer structure as defined above and optionally the other polymeric layers may be coextruded. It is possible to further perform ozone and/or corona treatment in a known way, if desired or necessary.

The main end-uses for extrusion coated products and articles obtained by using the heat sealable composition (A) according to the invention are in packaging applications, like liquid packaging for milk, juice, wine or other liquids, flexible packaging for snacks, confectionary, meat, cheese and medical products, rigid packaging like detergent cartons, cup and plate boards for oven or microwave use or in sterilizable food packaging, but also for photographic paper or industrial applications like paper reel and ream wraps, and technical laminates, preferably with sterilizable and/or retortable properties.

The present invention, as outlined above, therefore also provides a substrate, respectively article which has at least one layer of excellent sealing properties being propylene polymer based composition (A) according to the invention on at least one surface.

Furthermore the present invention is also directed to the use of the inventive article as packaging and lidding material, in particular as a packaging and lidding material for food and/or medical products.

In some embodiments of the invention the extrusion coated article is subjected to different machining and forming operations in a downstream process. Such operations include, for instance, drilling, punching and bending.

The polymer layer of the extrusion coated substrate has preferably a thickness in the range of 5 to 1,000 μm, more preferably in the range of 5 to 100 μm, such as from about 7 to 50 μm. The specific thickness will be selected according to the nature of the substrate, its expected subsequent handling conditions and, most importantly, the subsequent use of the end product. The thickness of the substrate may generally be chosen freely and has no effect on the coating process. It can typically be from 1 to 10,000 μm, e.g. 10 to 600 μm. The temperature of the polymer melt, i.e. of the composition melt, is typically between 240 to 330° C., preferably from 250 to 315° C.

It is also possible to employ a coating line with at least two extruders to make it possible to produce multilayered coatings with different polymers.

Thus, according to one embodiment of the invention the extrusion coated article (EC) can be produced by
extrusion coating a substrate (S) with a draw-down speed of at least 150 m/min by extruding a heat sealable layer (H) or coextruding at least the polymer layer structure (PL) in a molten state through a flat die onto said substrate at a temperature of from 240 to 320° C., wherein the heat sealable polymer layer (H) comprises composition (A) as defined above or is part of the polymer layer structure (PL) as defined above.

It is also possible to have arrangements to treat the polymer melt exiting the die to improve adhesion, e.g. by ozone treatment, and/or the substrate with corona treatment or flame treatment. For the corona treatment, for instance the substrate is passed between two conductor elements serving as electrodes, with such a high voltage, usually an alternating voltage (about 10000 V and 10000 Hz), being applied between the electrodes that spray or corona discharges can occur. Due to the spray or corona discharge, the air above the substrate surface is ionized and reacts with the molecules of the substrate surface.

The extrusion coated articles, with compositions of this invention and preparation thereof are more fully described by the following examples. Unless indicated to the contrary, all parts and percentages are by weight.

EXAMPLES

The following definitions of terms and determination methods apply for the above general description of the invention as well as to the below examples unless otherwise defined.

Measuring Methods:
Hot Tack Force

The maximum hot-tack force, i.e. the maximum of a force/temperature diagram is determined and reported.

Hot tack measurements were made with J&B hot tack tester following the method ASTM F 1921. The standard requires that the samples have to be cut into 15 mm slices in width. The samples are placed into the hot tack testing machine in vertical direction both ends attached to a mechanical lock. Then the tester seals and pulls out the hot seal and the resisting force is measured.

Sealing pressure, N/mm² 1.5
Sealing time, s 0.5
Cooling time, s 0.2
Peel speed, mm/s 200

Hot tack of each sample was established by testing hot tack forces with temperatures ranging from 90° C. to temperature where the measured hot tack force was below 1 N. The standard requires at least 3 parallel measurements to be done. The temperature was increased in steps of 5° C.

SIT and SET

SIT and SET values are obtained from hot tack measurement. In the present invention the lowest sealing temperature (SIT) is defined to be the temperature (° C.), where hot-tack strength is reaching 2 N, and highest sealing temperature (SET) is the temperature (° C.), where hot-tack strength is still at 2 N.

Maximum Hot-Tack Strength

Maximum hot-tack strength is defined to be the highest strength (N) level over 20° C. interval of sealing range.

Vicat—is measured according to ISO 306
Density is measured in accordance with ISO 1183
Melt Flow Rate $MFR_2$ Melt flow rate $MFR_2$ for polyethylene, like low density ethylene polymer, is measured in accordance with ISO 1133, at 190° C. and with 2.16 kg load, if not otherwise informed
Melt flow rate $MFR_2$ for polypropylene polymers is measured in accordance with ISO1133, at 230° C. and with 2.16 kg load, if not otherwise informed.

Layer Materials for the Extrusion Coated Article
Substrate Layer

As substrate layer (S) was used in all examples UG Kraft paper having a basis weight of 70 g/m².

Polymers and Compositions
Polymer Composition (a)

Polymer composition (a) was formed by melt blending propylene homopolymer with homoLDPE. The amount of LDPE was adjusted in the range of 5 to 45 wt-% to obtain $MFR_2$ (230° C./2.16 kg load) for the composition (a) in the range of 20-30 g/10 min, and Vicat temperature in the range of 125 to 130° C.

The same composition (a) was used in all examples as a polymer Layer 2 between the substrate (Kraft paper) layer (S) and the heat sealable polymer layer (H).

Plastomer (b)

As plastomer was used ethylene-octene copolymer produced in solution process with metallocene catalyst and having a density of 902 kg/m³ and $MFR_2$ (190° C./2.16 kg) of 10 g/10 min Polymer Composition (A)

Composition (A) was formed by dry blending composition (a) as defined above with ethylene-octene plastomer (b) as defined above. The amount of plastomer (b) was 20 wt-% based on the total amount of composition (A). This composition was used as Layer 1 in IE1.

Other Polymer Compositions

As other polymer compositions were used propylene random copolymer compositions having $MFR_2$ of 8 g/10 min and ethylene content 2 wt-% (C2) or 4 wt-% (C4). These compositions are used in comparative examples CE2 and CE3.

In all examples a polymer layer of composition (a) was used as a layer between the substrate layer and the heat sealable layer (H). Thus, it can be defined that the extrusion coated articles prepared in the examples comprise a substrate layer (S) and a polymer layer structure (PL) as follows:

Polymer layer structure (PL)
  Layer 1 (=top layer=heat sealable layer (H), as defined in examples)
  Layer 2 (=same in inventive and comparative examples=composition a)
  Substrate layer (S)=UG Kraft paper, 70 g/m² in all examples.
  Total amount of the polymer composition in the polymer layer structure was 18 g/m² (9 g/m² in Layer 1 and 9 g/m² in Layer 2).

Inventive Example 1 (IE1)

Polymer Composition (A) was used as a top layer (Layer 1), i.e. a heat sealable layer (H), in the inventive extrusion coated article.
  Thus, polymer layer structure in IE1 is:
  Layer 1 Polymer composition (A)
  Layer 2 Polymer composition (a)

Comparative Example 1 (CE1)

As a top layer (H) (Layer 1) was used composition a). No plastomer was added to the composition.
  Thus, polymer layer structure in CE1 is:
  Layer 1 Polymer composition (a)
  Layer 2 Polymer composition (a)

Comparative Example 2 (CE2)

As a top layer (H) (Layer 1) was used a propylene random copolymer composition having $MFR_2$ of 8 g/10 min and ethylene content of 2 wt-% (composition (C2)). No plastomer was added to the composition.
  Thus, polymer layer structure in CE2 is:
  Layer 1 Polymer composition (C2)
  Layer 2 Polymer composition (a)

Comparative Example 3 (CE3)

As a top layer (H) (Layer 1) was used a propylene random copolymer composition having $MFR_2$ of 8 g/10 min and ethylene content of 4 wt-% (composition (C4)). No plastomer was added to the composition.
  Thus, polymer layer structure in CE3 is:
  Layer 1 Polymer composition (C4)
  Layer 2 Polymer composition (a)

Formation of Extrusion Coated Article (EC):
  The extrusion coated articles composed of the same substrate layer (S) and polymer layer structures as indicated in IE1 and CE1 to CE3. The article was prepared according to the following method:
  Extrusion coating runs were made on Beloit coextrusion coating line. It had Peter Cloeren's EBR die and a five layer feed block. The width of the line was 850 to 1,000 mm and the maximum possible line speed was 1,000 m/min. The line speed was maintained at 150 m/min.
  In the EBR die (EBR stands for "edge bead reduction") two deckles, an upper and a lower deckle are adjusted to minimize the edge beads. The deckling is shown as the position of the deckles in mm from the starting, open, position. The first number indicates the position of the upper deckle and the second number the position of the lower deckle. For instance, deckling 70/30 means that the upper deckle has been moved to a position of 70 mm from the edge of the die and the lower deckle to 30 mm from the edge of the die.

In the coating line above a UG kraft paper was coated with a co-extruded structure, which was composed of the heat sealable top layer H (Layer 1), as disclosed above, and Layer 2 of composition a) attached to the paper substrate. (The temperature of the polymer melt was set to 290° C. and the extruders' temperature profile was 200-240-290-290° C. The chill roll was matt and temperature of its surface was 15° C. Used die opening was 0.65 mm and nip distance was 160 mm. Melt film touched the substrate for the first time+10 mm from nip to substrate side. Pressure of the pressure roll was 3.0 kp/cm². The line speed was 150 m/min.
  Ozone treatment for the melt (Wedeco) and Corona treatment for the substrate (Vetaphone) have been employed for all samples. Set point for ozone was 2.0 kW and thus concentration of ozone was 25 g/m³. Applicator's distance and angle from molten film was 70 mm and 45° C. Vetaphone ET5 corona treater had an output power of 12 kW and frequency of 18 to 35 kHz. It had an HF-amplifier with output voltage of 15 to 25 kV and multi-profile aluminum electrode. Set point for used corona was 12.0 kW.
  Sealing properties of the extrusion coated articles of the inventive example IE1 and comparative examples CE1 to CE3 are disclosed in Table 1.

TABLE 1

Sealing properties of the extrusion coated articles

| EC structure of Example | IE1 | CE1 | CE2 | CE3 |
|---|---|---|---|---|
| Max hot-tack strength/N | 4.5 | 3 | 3 | 4 |
| SIT/° C. | 95 | 110 | 110 | 100 |
| SET/° C. | 155 | 150 | 160 | 150 |
| Sealing window*/° C. | 60 | 40 | 50 | 50 |

*Sealing window = SET − SIT/° C.

As can be seen from the examples the inventive example shows improved maximum hot-tack strength and lowest SIT compared to compositions without the plastomer. SET was still maintained on a high level. Sealing window is thus broadened when using the inventive composition.

The invention claimed is:
1. A polymer composition (A) comprising a blend of
  i) 60 to 90 wt-% of propylene polymer composition (a) comprising a blend of
    (a-1) 55 to 95 wt-% of propylene polymer and
    (a-2) 5 to 45 wt-% of low density ethylene polymer (LDPE) which is a high pressure polyethylene,
  where the amounts of (a-1) and (a-2) are based on the total weight of composition (a), and composition (a) has a melt flow rate $MFR_2$ of from 10 to 50 g/10 min (230° C./2.16 kg) and the Vicat softening temperature in the range of 120 to 155° C. measured according to ISO 306,
  and
  ii) 10 to 40 wt-% of a plastomer (b) of ethylene copolymer with at least one α-olefin comonomer of 4 to 10 C-atoms, provided that at least one comonomer is a monomer with at least 6 C-atoms
  where the amounts of (i) and (ii) are based on the total weight of the composition (A), and
  wherein the plastomer b) has a density of 880 to 912 kg/m³.
2. The polymer composition (A) according to claim 1, wherein the plastomer (b) is an ethylene-C6-C10 α-olefin copolymer.

3. The polymer composition (A) according to claim 1, wherein the plastomer (b) is produced in a solution process in the presence of a metallocene catalyst.

4. The polymer composition (A) according to claim 1, wherein the plastomer (b) has $MFR_2$ (190° C./2.16 kg) in the range of 3 to 25 g/10 min.

5. The polymer composition (A) according to claim 1, wherein the polymer composition comprises a blend of
   i) 70 to 85 wt-% of propylene composition (a) and
   ii) 15 to 30 wt-% of plastomer (b)
   based on the total amount of composition (A).

6. The polymer composition (A) according to claim 1, wherein the propylene polymer (a-1) of composition (a) is propylene homopolymer or propylene random or block copolymer with ethylene and/or α-olefin comonomers of 4 to 12 C-atoms.

7. The polymer composition (A) according to claim 1, wherein the low density ethylene polymer (a-2) has a density from 860 to 940 kg/m³.

8. A polymer layer structure (PL) comprising
   1) Layer 1 of polymer composition (A) comprising a blend of
      i) 60 to 90 wt-% of propylene polymer composition (a) comprising a blend of
         (a-1) 55 to 95 wt-% of propylene polymer and
         (a-2) 5 to 45 wt-% of low density ethylene polymer (LDPE) which is a high pressure polyethylene,
      where the amounts of (a-1) and (a-2) are based on the total weight of composition (a), and composition (a) has a melt flow rate $MFR_2$ of from 10 to 50 g/10 min (230° C./2.16 kg) and the Vicat softening temperature in the range of 120 to 155° C. measured according to ISO 306,
      and
      ii) 10 to 40 percent by weight of a plastomer (b) of ethylene copolymer with at least one α-olefin comonomer of 4 to 10 C-atoms, provided that at least one co-monomer is a monomer with at least 6 C-atoms,
      where the amounts of (i) and (ii) are based on the total weight of the composition (A), and wherein the plastomer b) has a density of 880 to 912 kg/m³
      and
   2) Layer 2 of a polymer composition being different to composition (A).

9. An extrusion coated article (EC) comprising
   I. a substrate layer (S) and
   II. a heat sealable polymer layer (H),
   wherein the heat sealable polymer layer (H) comprises a composition (A) comprising a blend of
      i) 60 to 90 percent by weight of propylene polymer composition (a) comprising a blend of
         (a-1) 55 to 95 percent by weight of propylene polymer and
         (a-2) 5 to 45 percent by weight of low density ethylene polymer (LDPE) which is a high pressure polyethylene,
      where the amounts of (a-1) and (a-2) are based on the total weight of composition (a), and composition (a) has a melt flow rate $MFR_2$ of from 10 to 50 g/10 min (230° C./2.16 kg) and the Vicat softening temperature is in the range of 120 to 155° C. measured according to ISO 306,
      and
      ii) 10 to 40 percent by weight of a plastomer (b) of ethylene copolymer with at least one α-olefin comonomer of 4 to 10 C-atoms, provided that at least one co-monomer is a monomer with at least 6 C-atoms,
      where the amounts of (i) and (ii) are based on the total weight of the composition (A), and wherein the plastomer (b) has a density of 880 to 912 kg/m³.

10. The extrusion coated article (EC) according to claim 9, wherein the article comprises a Layer 2 of a polymer composition being different to composition (A) located between the substrate layer (S) and the heat sealable polymer layer (H).

11. The extrusion coated article (EC) according to claim 9 comprising I-i a substrate layer (S) and II-i a polymer layer structure (PL), said PL comprising
   1) Layer 1 of polymer composition (A) comprising a blend of
      i) 60 to 90 wt-% of propylene polymer composition (a) comprising a blend of
         (a-1) 55 to 95 wt-% of propylene polymer and
         (a-2) 5 to 45 wt-% of low density ethylene polymer (LDPE) which is a high pressure polyethylene,
      where the amounts of (a-1) and (a-2) are based on the total weight of composition (a), and composition (a) has a melt flow rate $MFR_2$ of from 10 to 50 g/10 min (230° C./2.16 kg) and the Vicat softening temperature in the range of 120 to 155° C. measured according to ISO 306, and
      ii) 10 to 40 percent by weight of a plastomer (b) of ethylene copolymer with at least one α-olefin comonomer of 4 to 10 C-atoms, provided that at least one co-monomer is a monomer with at least 6 C-atoms,
      where the amounts of (i) and (ii) are based on the total weight of the composition (A), and wherein the plastomer b) has a density of 880 to 912 kg/m³
      and
   2) Layer 2 of a polymer composition being different to composition (A).

12. The extrusion coated article (EC) according to claim 9, wherein the plastomer (b) is produced in solution process in the presence of a metallocene catalyst.

13. The extrusion coated article (EC) according to claim 9, wherein the plastomer b) is an ethylene-C6-C10 α-olefin copolymer.

14. The extrusion coated article (EC) according to claim 9, wherein the substrate layer (S) is selected from the group consisting of paper, paperboard, kraft paper, a plastic film, metallised plastic film, a metal foil, woven fabric or plastic, and combinations thereof.

15. The extrusion coated article (EC) according to claim 9, wherein the article comprises at least one layer (M) being of a polymeric film, metal foil, metallised polymeric film, layer of fibrous material or combinations thereof.

16. A process for producing an extrusion coated article (EC) comprising
   extrusion coating a substrate (S) with a draw-down speed of at least 150 m/min by extruding a heat sealable layer (H) or co-extruding at least the polymer layer structure (PL) in a molten state through a flat die onto said substrate at a temperature of from 240 to 320° C.,
   wherein the heat sealable polymer layer (H) comprises composition (A) as defined in claim 1 or is part of a polymer layer structure (PL), said PL comprising
   1) Layer 1 of polymer composition (A) comprising a blend of
      i) 60 to 90 wt-% of propylene polymer composition (a) comprising a blend of (a-1) 55 to 95 wt-% of propylene polymer and
(a-2) 5 to 45 wt-% of low density ethylene polymer (LDPE) which is a high pressure polyethylene,
where the amounts of (a-1) and (a-2) are based on the total weight of composition (a), and composition (a) has a melt flow rate $MFR_2$ of from 10 to 50 g/10 min (230° C./2.16 kg) and the Vicat softening temperature in the range of 120 to 155° C. measured according to ISO 306, and
  ii) 10 to 40 percent by weight of a plastomer (b) of ethylene copolymer with at least one α-olefin comonomer of 4 to 10 C-atoms, provided that at least one co-monomer is a monomer with at least 6 C-atoms,
where the amounts of (i) and (ii) are based on the total weight of the composition (A), and wherein the plastomer b) has a density of 880 to 912 kg/m$^3$
and
2) Layer 2 of a polymer composition being different to composition (A).

17. A heat sealable layer of an extrusion coated article, said heat sealable layer comprising the polymer composition (A) as defined in claim 1.

* * * * *